United States Patent [19]

Bazes

[11] Patent Number: 4,675,556
[45] Date of Patent: Jun. 23, 1987

[54] BINOMIALLY-ENCODED FINITE STATE MACHINE

[75] Inventor: Mel Bazes, Santa Clara, Calif.

[73] Assignee: Intel Corporation, Santa Clara, Calif.

[21] Appl. No.: 871,809

[22] Filed: Jun. 9, 1986

[51] Int. Cl.⁴ .......................................... H03K 19/094
[52] U.S. Cl. ..................... 307/465; 307/449; 307/468; 307/469; 340/347 DD; 340/825.91; 364/716
[58] Field of Search ............... 307/443, 465, 466, 468, 307/469, 449, 463; 364/716; 377/33–34; 340/347 DD, 825.8, 825.83, 825.87, 825.89–825.91, 825.94

[56] References Cited

U.S. PATENT DOCUMENTS

| | | | |
|---|---|---|---|
| 4,032,894 | 6/1977 | Williams | 307/466 X |
| 4,208,728 | 6/1980 | Blahut et al. | 307/465 X |
| 4,233,667 | 11/1980 | Devine et al. | 364/716 X |
| 4,562,426 | 12/1985 | Forney, Jr. | 340/347 DD |
| 4,584,567 | 4/1986 | Kinghorn | 340/347 DD |

OTHER PUBLICATIONS

Rhyne, Fundamentals of Digital Systems Design, Prentice-Hall, Inc., pub., 1973, pp. 229–235.
O'Hara, Jr., "PLA Multifunction Output Latches, IBM T.D.B., vol. 20, No. 12, May 1978, pp. 5205–5208.
Greenspan, "Multiple Partitioned Programmable Logic Array", IBM T.D.B., vol. 19, No. 5, Oct. 1976, pp. 1780–1781.

Primary Examiner—Stanley D. Miller
Assistant Examiner—D. R. Hudspeth
Attorney, Agent, or Firm—Blakely, Sokoloff, Taylor & Zafman

[57] ABSTRACT

A finite state machine suitable for MOS fabrication is described. The finite state machine includes a programmed logic array (PLA). The PLA AND plane includes logical inputs and state signal inputs. The state signal inputs are decoded binomially. The state signals are used to activate the AND plane loads, thereby avoiding the necessity of using either a constantly active pull-up or precharge/selective discharge circuitry technique.

7 Claims, 4 Drawing Figures

BINOMIALLY-ENCODED FINITE STATE MACHINE

BACKGROUND OF THE INVENTION

1. Field of the Invention

The present invention relates to the field of finite state machines.

2. Prior Art

A finite state machine (FSM) is a commonly used technique in logical processing devices. In integrated circuits, FSMs are usually built using programmed logic arrays (PLA).

One method for implementing such an FSM involves the use of a constantly active pull-up device in the PLA. A constantly active pull-up will draw current at all times that power is being supplied to the circuit. This technique results in excessive D.C. current consumption. Excessive current consumption in integrated circuits causes the device to generate unwanted heat resulting in component reliability problems. Further, excessive current consumption in individual components creates system design problems because of the limitations imposed on remote site battery applications, as well as the necessity to increase system power bus capacity and signal shielding requirements.

Another method for implementing such an FSM involves the use of precharge/selective discharge circuitry. This technique requires more stringent timing specifications. These more stringent timing requirements create the need for complicated circuitry. Generally, the system clock must either be split into two phases or an additional clock signal must be supplied in order to implement a precharge/selective discharge PLA circuit. Such complex circuitry often creates manufacturing and yield problems. Prior approaches to solving the FSM design clearly contain inherent problems.

SUMMARY OF THE INVENTION

The present invention provides a novel realization of a finite state machine (FSM) based on a programmed logic array (PLA) circuit. The FSM is particularly suitable for MOS integrated circuit technology since the FSM PLA can be easily built and modified for a wide variety of user applications.

In the preferred embodiment, the FSM is realized using a PLA. A plurality of first lines and second lines are coupled into the AND plane of said PLA. A binomial decoding means for selectively activating ones of said second lines is coupled to receive state signals of the FSM. The binomial decoding means also controls load transistors coupled to the second lines. The number of the load transistors is equal to the number of ones required by the binomial decoding scheme. This circuit allows only the appropriate second line to be active for each new state of the FSM, thereby eliminating excessive D.C. current consumption that is a by-product of the constantly active pull-up technique.

This embodiment selects only the appropriate second line for any given finite state and requires only one clock cycle for the decode and next state generation to take place. Thus, no precharge/selective discharge circuitry is required, thereby eliminating the need for complex circuitry design.

DETAILED DESCRIPTION OF THE PRESENT INVENTION

An improved FSM which includes a PLA is disclosed. The FSM is particularly suited for MOS integrated circuit technology since it incorporates the use of easily reprogrammable or changed PLA circuitry. Its low power requirements also make it attractive for implementation in CMOS technology.

In the following description, numerous specific details are set forth, such as specific circuits. It will be understood by one of ordinary skill in the art that the invention may be practiced without these specific details. Well-known MOS processing is not described in this application since the present invention may be fabricated with numerous well-known processes.

Figure 1:
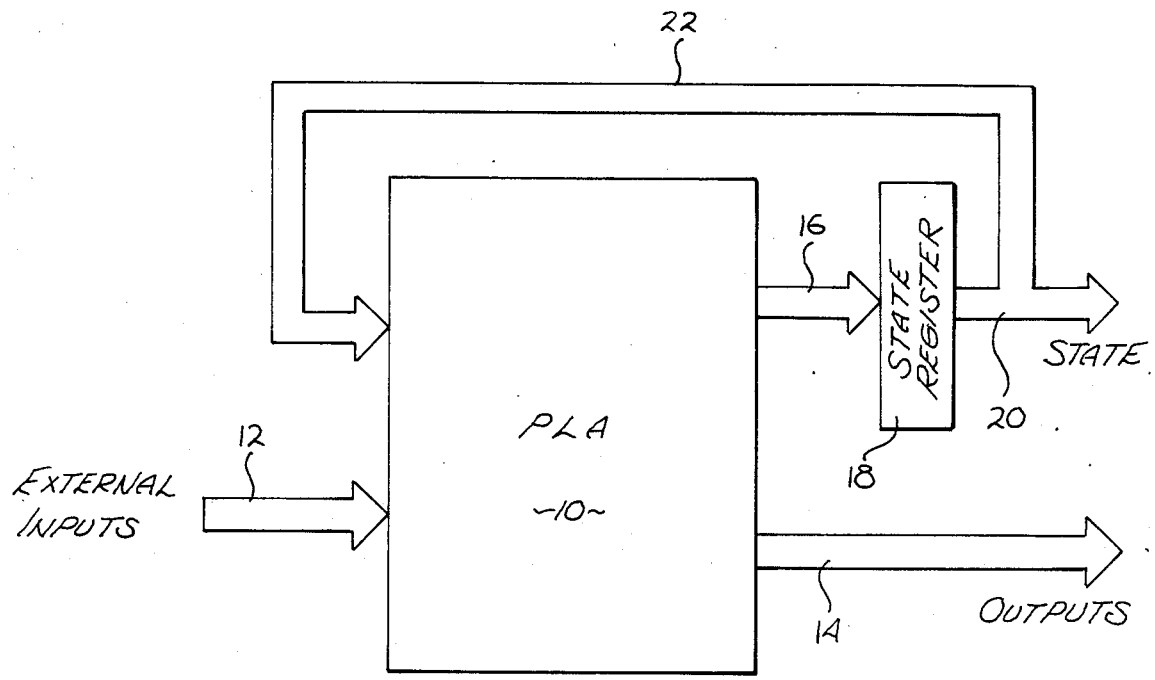
FIG. 1 is a block diagram showing the basic theory of operation of an embodiment of the present invention.

Referring to FIG. 1, a block diagram of a basic configuration for an FSM is shown. A PLA 10 is the basic logical element of the FSM. The inputs to the PLA are the external inputs bus 12 and the output of the state signal bus 22, each of which may be composed of any number of lines. The outputs from the PLA 10 is bus 14 and the input bus 16 to the state register 18, each of which may be composed of any number of lines.

The state register 18 stores the last state of the FSM. The output of the state register 18 goes to another part of the system of which the FSM is a part through bus 20 and also is fed back into the FSM through bus 22. Thus, with each new clock cycle the PLA 10 accepts new external inputs from bus 12, and the state signal representing the previous state of the FSM from bus 22 and then acts on these inputs to send new data to the output bus 14 and the state register 18 through bus 16.

Figure 2:
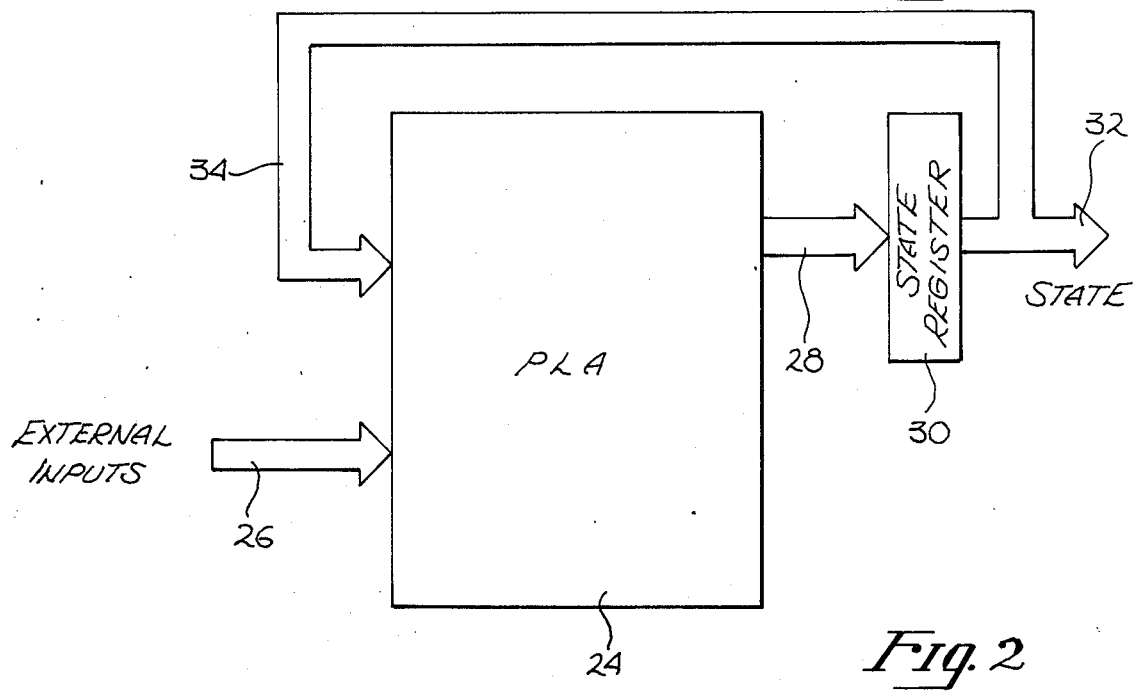
FIG. 2 is a block diagram showing the basic theory of a simplified mode of operation of an embodiment of the present invention.

Referring to FIG. 2, a block diagram of a simplified basic configuration for an FSM is shown. In many applications for an FSM there is no need for the FSM to develop output signals as in the circuit of FIG. 1. Rather, the FSM generates only state signals and the outputs are generated by another portion of the system of which the FSM is a part.

A PLA 24 is the basic logical element of the FSM. The inputs to the PLA 24 are the external inputs bus 26 and the output of the state signal bus 34, each of which may be composed of any number of lines. The outputs from the PLA 24 is bus 28, which may be composed of any number of lines and also acts as the input to the state register 30.

The state register 30 stores the last state of the FSM. The output of the state register 30 is coupled to another part of the system of which the FSM is a part through bus 32 and also is fed back into the FSM through bus 34. Thus, with each new clock cycle the PLA accepts new external inputs from bus 26, and the state signal representing the previous state of the FSM from bus 34 and then acts on these inputs and sends new data to the state register 30 through bus 28.

A PREFERRED EMBODIMENT OF THE INVENTION

Figure 3:
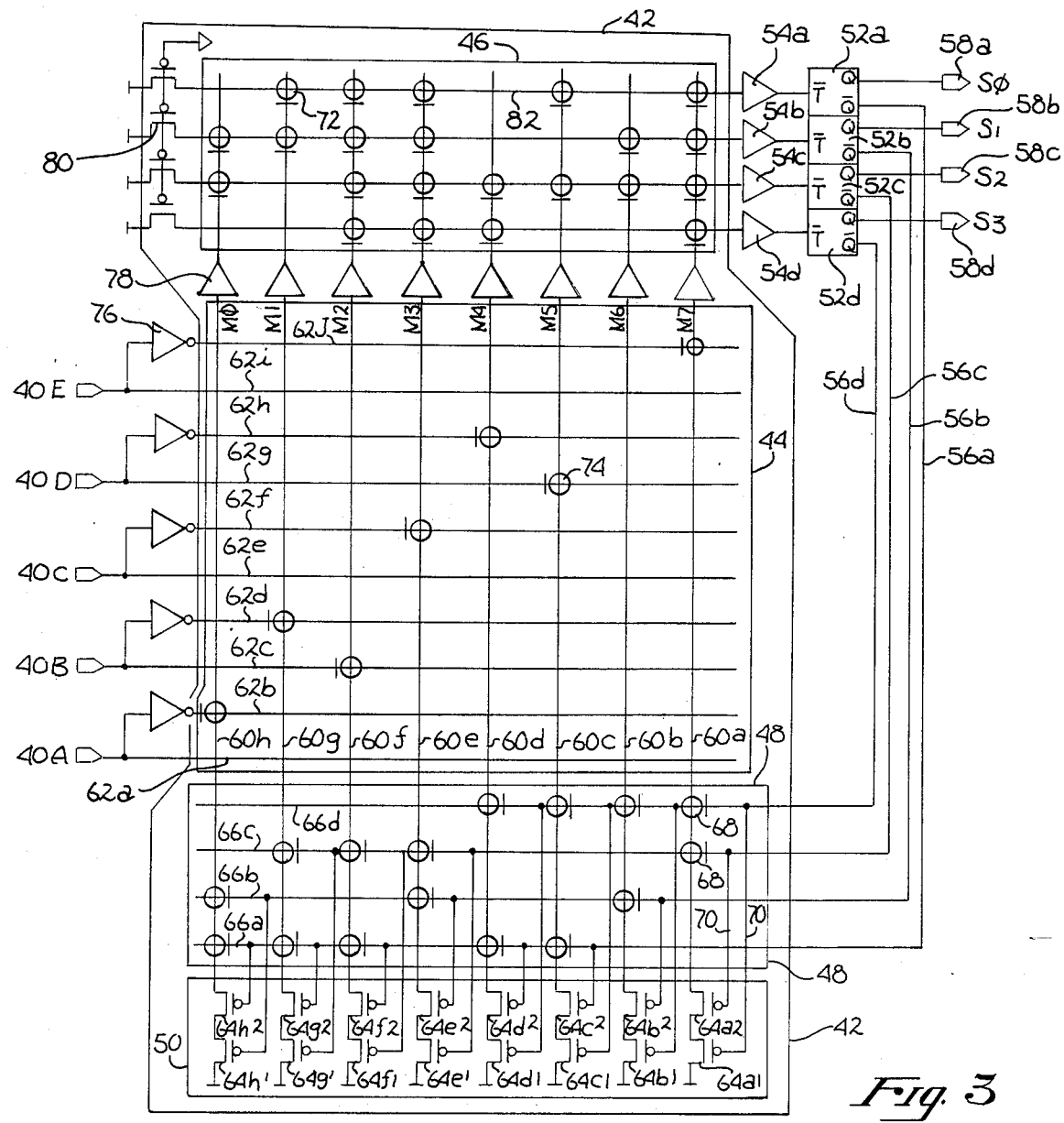
FIG. 3 is an electrical schematic showing a presently preferred embodiment of the present invention.

Referring to FIG. 3, a schematic diagram of the invented FSM is shown. The external inputs to the circuit of FIG. 3 are lines 40a through 40e. The PLA 42 consists of an AND plane 44, an OR plane 46, a decoding circuit 48 and decoder load circuitry 50. The output of the PLA is coupled through buffers 54a through 54d into the state registers 52a through 52d. The state register outputs are coupled to another part of the system of which the FSM is a part through bus 58 which consists of lines 58a through 58d. The state register outputs are also coupled back into the FSM PLA state signal binomial decoder 48 through bus 56 which consists of lines 56a through 56d.

FIG. 3 is a schematic diagram of an electronic circuit for one implementation of an FSM designed pursuant to the instant invention. The external inputs 40 to the PLA 42 are coupled to a set of first lines 62 which are drawn as horizontal lines in the AND plane 44. The external inputs 40, in this instance, are also inverted by the inverters 76. Thus, 62a and 62b will always have complementary data from one to the other as will 62c and 62d and so on.

A set of second lines 60 is also contained in the AND plane of the PLA. Each of the set of second lines 60 intersects each of the set of first lines 62. At certain of these intersections, and totally dependent upon the specific function that the circuit is intended to implement, there may be a transistor 74 which operates to logically AND the signals on the appropriate first line 62 and second line 60. The second lines 60 are coupled to buffers 78 and continue into the OR plane 46.

A set of third lines 82 is also contained in the OR plane and intersects the continuation of the set of second lines 60. At certain of these intersections, and totally dependent upon the specific function that the circuit is intended to implement, there may be a transistor 72 which operates to logically OR the signals on the appropriate second lines 60 and third line 82. Coupled to the third lines 82 are p-channel load transistors 80. Also coupled to the third lines 82 are buffers 54 which are used to couple the output of the OR plane into the state registers 52.

In the instant application, the state registers 52 are T (toggle) flip flops. The choice of using the T flip flop in the instant invention is totally dependent upon the application; any other type of electronic storage element other than a T flip flop could have been used. The output of T flip flop only changes after the input to the T flip flop changes.

In the instant application, and totally dependent upon the specific function that the circuit is intended to implement, the outputs 58 of the FSM are taken from the noninverted output of each state register 52, and the state signal feedback signals 56 are taken from the inverted output of each state register 52. The FSM outputs 58 and the state signal feedback signals 56 could also use the same output as each other as required by the specific application. The state signal feedback signals 56 are inputs to the decoder 48 and are coupled to a set of fourth lines 66. The set of second lines 60 is also contained in the decoder 48 and intersects the set of fourth lines 66. At certain of these intersections, and totally dependent upon the specific function that the circuit is intended to implement, there may be a transistor 68 which operates to decode the signals on the appropriate second line 60 and fourth line 66.

Coupled to the second lines 60 are p-channel load transistors 64. Coupled to the fourth lines 66 are inputs to the load transistors 64 and the load circuitry 50. The number of load transistors 64 and decode transistors 68 will always be equal to the number of "ones" in the binomial decoding scheme selected for the specific application.

The decoding mechanism for the state signal feedback bus 58 to the FSM consists of the binomial decoder 4B and the decoded load to the PLA 50. The state signal feedback bus signals are inputs to the binomial decoder 48 on lines 66a through 66d. By appropriately selecting the placement of decode transistors 68a through 68x and inputs 70 to the load transistors 64 for the columns 60a through 60h, only those loads 64a1 through 64h2 and columns 60a through 60h to the AND plane 44, that are properly activated by the state signal feedback bus 56 lines with a logical zero, affect the next state register status.

A binomial decoding scheme is the preferred scheme because the number of ones and zeros in each term is always the same. An example of a binomial decoding scheme compared to a binary decoding scheme for 4 character terms is shown in Table 1.

TABLE 1

| Binary code | Binomial code 1 — "one" | Binomial code 2 — "ones" | Binomial code 3 — "ones" |
|---|---|---|---|
| 0000 | 0001 | 0011 | 0111 |
| 0001 | 0010 | 0101 | 1011 |
| 0010 | 0100 | 0110 | 1101 |
| 0011 | 1000 | 1001 | 1110 |
| 0100 |  | 1010 |  |
| 0101 |  | 1100 |  |
| 0110 |  |  |  |
| 0111 |  |  |  |
| 1000 |  |  |  |
| 1001 |  |  |  |
| 1010 |  |  |  |
| 1011 |  |  |  |
| 1100 |  |  |  |
| 1101 |  |  |  |
| 1110 |  |  |  |
| 1111 |  |  |  |

The relationship for the number of combinations contained in a binomial coding schedule for any number of bits is given by the mathematical expression:

$$c = \frac{n!}{k!\,(n-k)!} \tag{1}$$

where:
c is the number of combinations of terms
n is the number of bits in the term, and
k is the number of "ones" in each term.

The density of the binomial decoding scheme is lower than the density for a binary scheme. This means that to decode the same number of terms using a binomial decoding scheme will require using a larger number of bits per term than with a binary decoding scheme. However, when using a binomial decoding scheme the number of load transistors 64 and decode transistors 68 will be the same for each logical minterm of the FSM PLA 42. This eliminates the need to adjust the load transistor current carrying capability and speed parameters for each column 60 that would result of necessity from the use of a binary decoding scheme.

Figure 4:
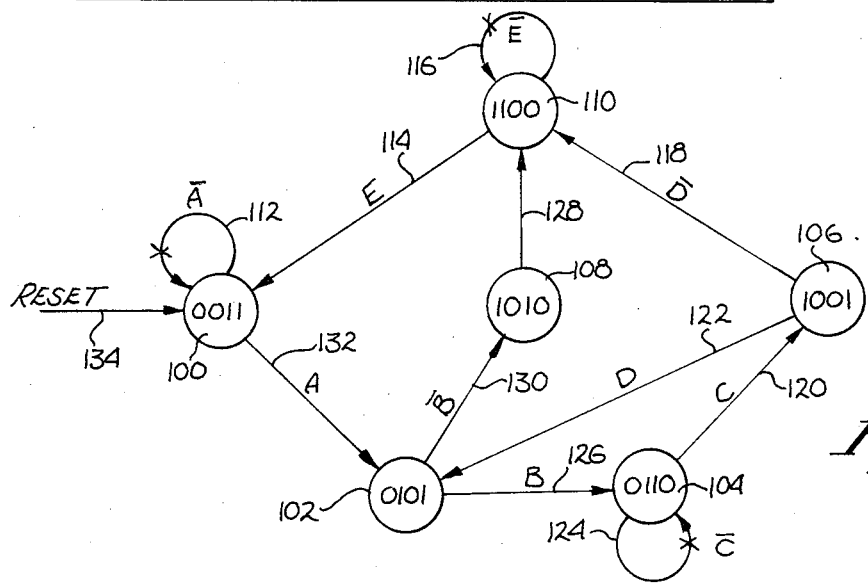
FIG. 4 is a state diagram for operation of the circuit of FIG. 3.

Referring to FIG. 4, a state diagram is shown for the circuit of FIG. 3. Each of the circles 100, 102, 104, 106, 108 and 110 represents a logical state. Each of the arrows 112, 114, 116, 118, 120, 122, 124, 126, 128, 130 and 132 represents a transition between states based on external inputs 40 and state variables 56. In the instant application the reset signal 134 is a hardware signal to the T flip flops 52 in FIG. 3. For example, if the output of the state register 52 is 0101, as illustrated in FIG. 4 as 102, and the external input 40 is B 126, then the state signals 56 and the decoder 50 will select the load transistors 64f1, 64f2, 64g1 and 64g2 and activate the second and third columns 60f and 60g of the second lines 60.

The logic state that will create a logical AND with the selected column of 60 is a logic "zero". Thus, the column selected by the input B is 60g. Column 60g has two transistors 72 in the OR plane 46 which will affect the two low order bits of the state register 52. As can be seen in the state diagram of FIG. 4, a state of 0101 102 with an external input of B 126 will cause a change in the two low order bits and yield as a result the state of 0110 104.

The transitions 112, 118, and 124 are marked with an "x" to signify that they do not have corresponding columns 60. These columns are not required since transitions from a state back into itself never activate the inputs 54 of the T flip flops of the state register 52. Thus, if these columns were included, it would be found that no transistor 72 in the OR plane 46 would be connected to them. Hence, these columns are superfluous and, therefore, not included.

Thus, an improved FSM has been disclosed.

I claim:

1. A finite state machine (FSM) circuit which includes a programmed logic array (PLA), comprising:
    a plurality of first lines for receiving inputs to said PLA;
    a plurality of second lines intersecting said first lines;
    logic performing means for selectively coupling ones of said first lines with ones of said second lines;
    a plurality of switchable loads coupled to said second lines for selectively enabling operation of said logic performing means; and
    a decoding means for receiving and decoding state outputs of the FSM and for selectively activating certain of said switchable loads as a function of said decoded FSM outputs, said decoding means coupled to said switchable loads, whereby an improved FSM is realized.

2. The circuit of claim 1 wherein the decoding means operates in accordance with a binomial decoding algorithm having a number c of terms, each term uniquely representative of each of said FSM state outputs, each term comprised of a fixed number n of bits, in which the number of said bits which are logic ones is a constant number k for each of said terms.

3. The circuit of claim 2 wherein the number c of terms is given by $$c = \frac{n!}{k!(n-k)!}$$

4. The circuit of claim 2 wherein each of said plurality of switchable loads comprises a respective plurality of load transistors coupled in series to each of said second lines.

5. The circuit of claim 1 wherein said logic performing means performs the logical AND function, whereby each of said second lines represents the logical AND of said ones of said first lines.

6. The circuit of claim 4 wherein the number of said load transistors coupled in series to each of said second lines is equal to the number k of logic ones required by the binomial scheme.

7. The circuit of claim 6 further comprising a plurality of third lines selectively coupled to ones of said second lines such that each of said third lines represents the logical OR of said ones of said second lines, whereby said third lines provide said state outputs of the FSM.

* * * * *